US 8,520,543 B2

(12) United States Patent
Park et al.

(10) Patent No.: US 8,520,543 B2
(45) Date of Patent: Aug. 27, 2013

(54) DATA TRANSMISSION SYSTEM FOR TRANSMITTING CONTROL INFORMATION TO BASE STATION

(75) Inventors: Ok-Sun Park, Daejeon (KR); Gi Yoon Park, Daejeon (KR); Daeho Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 327 days.

(21) Appl. No.: 12/969,204

(22) Filed: Dec. 15, 2010

(65) Prior Publication Data
US 2011/0141988 A1   Jun. 16, 2011

(30) Foreign Application Priority Data
Dec. 15, 2009   (KR) .................. 10-2009-0124388

(51) Int. Cl.
*H04W 72/04* (2009.01)
*H04W 72/12* (2009.01)

(52) U.S. Cl.
USPC ............ 370/252; 370/328; 370/338; 455/423

(58) Field of Classification Search
USPC .......... 370/252, 328, 330, 338, 329; 455/423
See application file for complete search history.

(56) References Cited

U.S. PATENT DOCUMENTS

| 7,493,135 | B2 * | 2/2009 | Kim et al. | 455/522 |
|---|---|---|---|---|
| 8,380,135 | B2 * | 2/2013 | Ko et al. | 455/68 |
| 8,416,872 | B2 * | 4/2013 | Higuchi et al. | 375/267 |
| 2007/0248113 | A1 | 10/2007 | Ko et al. | |
| 2009/0097466 | A1 * | 4/2009 | Lee et al. | 370/344 |
| 2009/0185577 | A1 * | 7/2009 | Kishiyama et al. | 370/465 |
| 2009/0213955 | A1 * | 8/2009 | Higuchi et al. | 375/267 |
| 2009/0296644 | A1 * | 12/2009 | Cheon et al. | 370/329 |
| 2010/0195624 | A1 * | 8/2010 | Zhang et al. | 370/335 |
| 2010/0239040 | A1 * | 9/2010 | Beluri et al. | 375/267 |
| 2010/0279625 | A1 * | 11/2010 | Ko et al. | 455/68 |
| 2010/0316154 | A1 * | 12/2010 | Park et al. | 375/267 |
| 2011/0013615 | A1 * | 1/2011 | Lee et al. | 370/344 |
| 2012/0051311 | A1 * | 3/2012 | Kim et al. | 370/329 |

FOREIGN PATENT DOCUMENTS

| EP | 2075948 A2 | 7/2009 |
|---|---|---|
| KR | 2002-0067961 | 8/2002 |

OTHER PUBLICATIONS

3GPP TS 36.212 V8.5.0 (2008-12), 3rd Generation Partnership Project; Technical Specification Group Radio Access Network; Evolved Universal Terrestrial Radio Access (E-UTRA); Multiplexing and channel coding (Release 8). pp. 1-58.*

* cited by examiner

*Primary Examiner* — Chi Pham
*Assistant Examiner* — Ahmed Elallam
(74) *Attorney, Agent, or Firm* — Nelson Mullins Riley & Scarborough LLP

(57) ABSTRACT

Provided is a data transmission system for transmitting control information from a terminal to a base station. The terminal may multiplex the control information, and may transmit the multiplexed control information to the base station using a plurality of transmit antennas. The base station may receive the multiplexed control information and combine the control information. The base station may transmit data to the terminal using the control information.

19 Claims, 8 Drawing Sheets

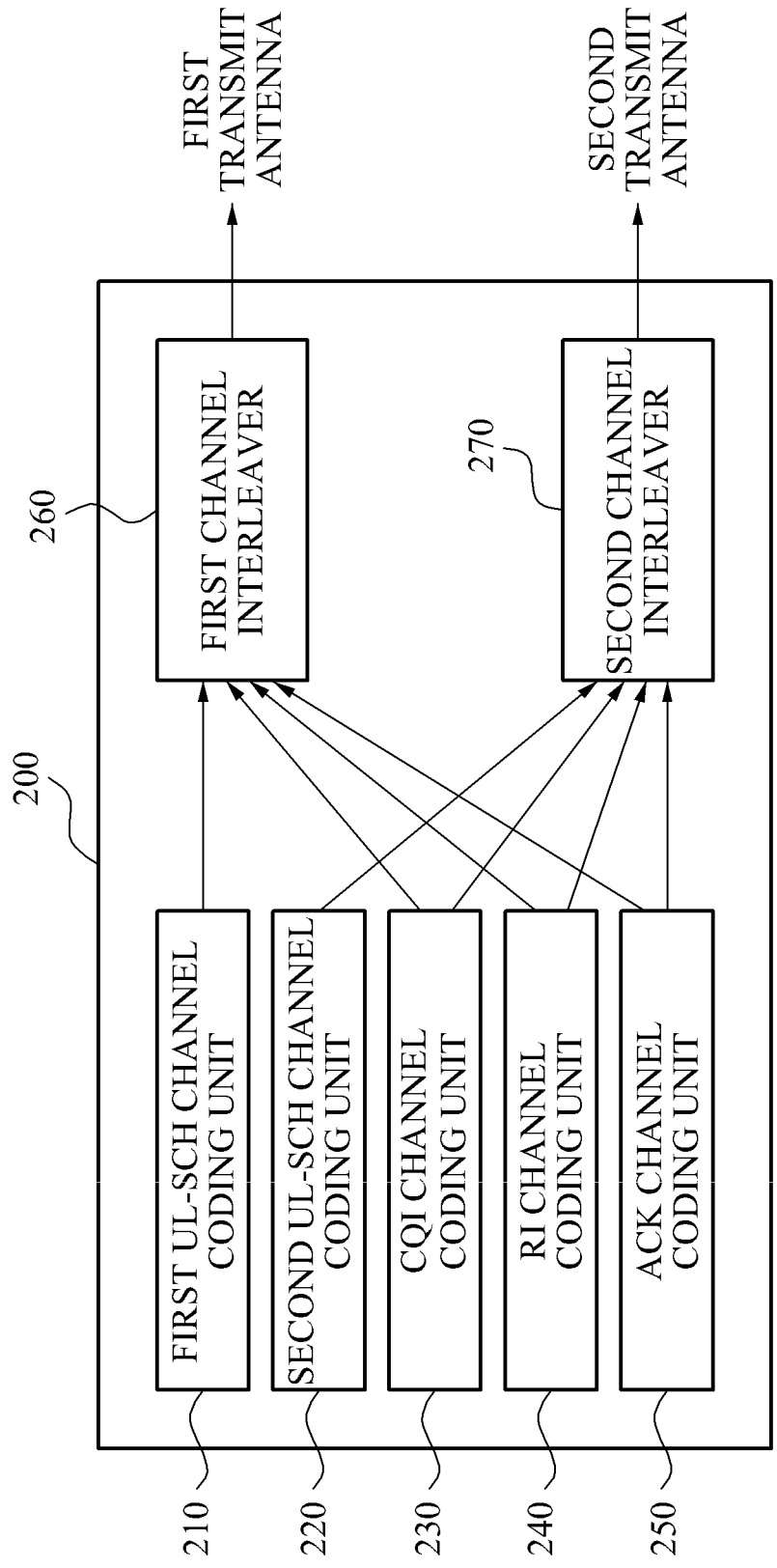

DATA TRANSMISSION SYSTEM FOR TRANSMITTING CONTROL INFORMATION TO BASE STATION

CROSS-REFERENCE TO RELATED APPLICATION

This application claims the benefit of Korean Patent Application No. 10-2009-0124388, filed on Dec. 15, 2009, in the Korean Intellectual Property Office, the disclosure of which is incorporated herein by reference.

BACKGROUND

1. Field of the Invention

The present invention relates to a mobile communication system, and more particularly, to technology that may transmit control information from a terminal to a base station.

2. Description of the Related Art

An uplink of a $3^{rd}$ Generation Partnership Project (3GPP) Long Term Evolution (LTE) system and an LTE-Advanced system may transmit a single carrier based on a single carrier-frequency division multiple access (SC-FDMA) scheme. Accordingly, when a terminal is assigned with an uplink data channel, control signaling may occur. The control signaling may be time division multiplexed and thereby be mapped to each SC-FDMA symbol. A data transmission channel for transmitting an uplink transport block is referred to as Uplink Shared Channel (UL-SCH). To transfer control information used for transmitting an uplink transmission channel and a downlink transmission channel, uplink control signaling may be performed with respect to Hybrid Automatic Request (HARQ)-Acknowledgment (ACK), channel state information, and the like. Uplink control signaling defined in the existing 3GPP LTE system may follow as:

HARQ-ACK corresponds to very important information in a downlink operation to feed back, to a base station, a detection result with respect to a downlink transport block received by a terminal. The base station may be aware of a point in time when HARQ-ACK is to be received based on a point in time when the downlink transport block is transmitted. However, when the terminal does not detect downlink scheduling information, HARQ-ACK may not be transmitted. When a data rate matching pattern of a data channel varies depending on HARQ-ACK, the data channel may not be successfully decoded. Accordingly, HARQ-ACK may be transmitted by puncturing a portion of encoded data channel bits.

The channel state information may include channel quality information (CQI), a precoding matrix indicator (PMI), and a rank indicator. Only when the base station requests CQI for uplink scheduling information, the channel state information may be transmitted using the data channel. As described above, the base station may need to be accurately aware of a point in time when the channel state information needs to be transmitted. Accordingly, in the case of data rate matching of the data channel, a magnitude of the channel state information may be included. When the channel state information is multiplexed with the data channel and thereby is transmitted, a code rate may be enhanced.

SUMMARY

According to an aspect of the present invention, there is provided a terminal including a plurality of transmit antennas, the terminal including: a bit count determining unit to determine the number of control information bits with respect to each of the transmit antennas based on a data rate of each of the transmit antennas; a control information segmentation unit to segment the control information into a plurality of control information blocks based on the determined number of bits; and a transmitter to transmit each of the control information blocks to a base station using a transmit antenna corresponding to each of the control information blocks.

According to another aspect of the present invention, there is provided a base station including: a receiver to receive, from a plurality of transmit antennas installed in a terminal, a data stream corresponding to each of the transmit antennas; a demultiplexer to extract a control information block included in each of data streams; a control information combiner to generate control information by combining the extracted control information blocks; and a transmitter to transmit data to the terminal based on the combined control information.

According to still another aspect of the present invention, there is provided a terminal including: a channel coding unit to perform channel coding of control information; a control information segmentation unit to segment the channel coded control information into a plurality of control information blocks; an interleaver to generate a bitstream corresponding to each of a plurality of transmit antennas by interleaving each of the segmented control information blocks; and a transmitter to transmit each of generated bitstreams using a transmit antenna corresponding to each of the generated bitstreams.

According to embodiments of the present invention, since control information may be multiplexed using a plurality of transmit antennas, the transmission efficiency of the control information may be enhanced.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 2 is a block diagram illustrating a configuration of a channel coding unit according to an embodiment of the present invention;

DETAILED DESCRIPTION

Figure 1:
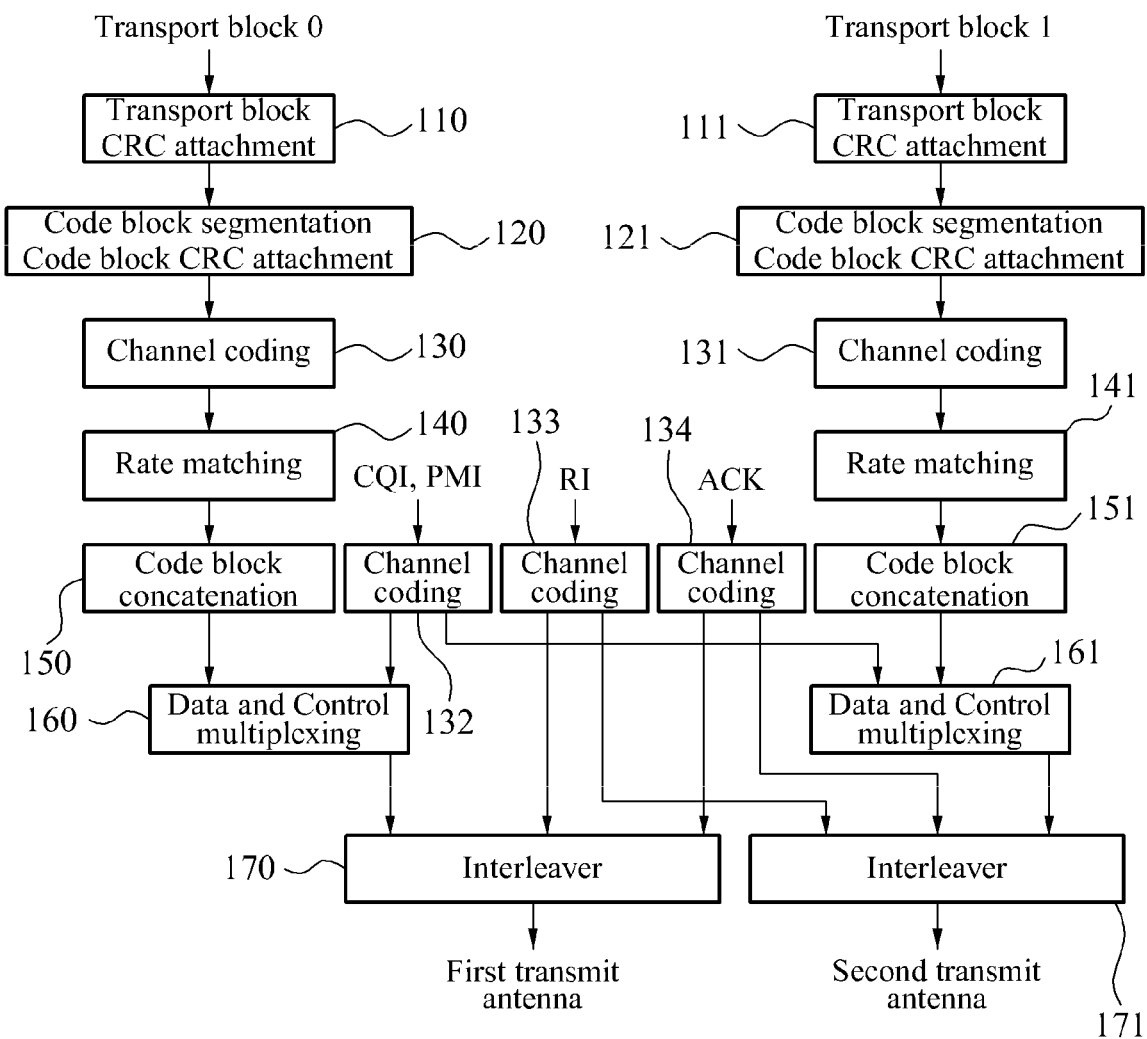
FIG. 1 is a diagram illustrating a channel coding procedure of a terminal to multiplex control information using a plurality of physical channels according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a channel coding procedure of a terminal to multiplex control information using a plurality of physical channels according to an embodiment of the present invention. Hereinafter, the present invention will be described based on an embodiment where the terminal multiplexes control information using two transmit antennas and transmits the multiplexed control information to the base station. However, the present invention is not limited thereto. The terminal may multiplex control information using at least three transmit antennas and transmit the multiplexed control information to the base station.

The control information may include at least one of channel quality information (CQI) associated with a channel formed between the base station and the terminal, a precoding matrix index (PMI) of the channel, a rank indicator (RI) of the channel, and downlink data acknowledgement (ACK). The terminal may transmit the control information to the base station. The base station may transmit downlink data to the terminal by referring to the control information.

Uplink data transferred from the terminal to the base station may be transmitted from an upper layer. The uplink data transmitted from the uplink layer is already separated based on a plurality of physical channels. As shown in blocks 110, 111, 120, and 121, a cyclic redundancy check (CRC) code may be attached to the uplink data classified based on a data block. Each of channel coding units 130 and 131 may perform channel coding of each segmented data block using a predetermined channel coding scheme.

Each of data rate matching units 140 and 141 may match a data rate of each uplink data based on a quality of service (QoS) and a data rate individually determined with respect to each transmit antenna.

Each of code block concatenation units 150 and 151 may concatenate data blocks matched with data rates.

Each of data and control information multiplexers 160 and 161 may multiplex the uplink data and the control information. When the control information is multiplexed with the uplink data and thereby is transmitted, a channel coding unit 132 may perform channel coding of the control information. The channel coded control information may be multiplexed with the uplink data and thereby be input to channel interleavers 170 and 171.

When the control information is not multiplexed with the uplink data, each of channel coding units 133 and 134 may perform channel coding of the control information, and the channel coded control information may be input to the channel interleavers 170 and 171.

The channel interleavers 170 and 171 corresponding to physical channels may perform interleaving with respect to the multiplexed uplink data and control information, or non-multiplexed control information.

The control information channel coded by the channel coding units 132, 133, and 134 may be segmented into a plurality of control information blocks. The divided control information blocks may correspond to the plurality of physical channels, respectively. Each of the control information blocks may be transmitted via a transmit antenna corresponding to each of the physical channels.

A data rate may be individually determined with respect to each physical channel. For example, when excellent radio channel states are formed between a transmit antenna corresponding to each physical channel and receivers of the base station, the data rate may be determined to have a relatively great value. However, when the state of the radio channel is not excellent, the data rate may be determined to have a relatively small value. Accordingly, when a plurality of physical channels are assigned as shown in FIG. 1, the data rate may be determined to have a different value with respect to each of the physical channels.

A length of a control information block assigned to each physical channel may be determined based on the data rate determined with respect to each physical channel. The length of the control information block may be determined to transmit a relative large amount of control information using the excellent state of the radio channel, and to transmit a relatively small amount of control information using the non-excellent state of the radio channel. The control information block assigned to each physical channel may be transmitted to the base station via the radio channel corresponding to each physical channel.

According to an embodiment of the present invention, it is possible to obtain an excellent transmission throughput by multiplexing control information with respect to each physical channel based on a state of a radio channel.

FIG. 2 is a block diagram illustrating a configuration of a channel coding unit 200 according to an embodiment of the present invention.

A conventional terminal may transmit control information to a base station using only a single transmit antenna. The conventional terminal may perform channel coding of uplink data using a single uplink data channel coding unit, and may transmit uplink data and control information to the base station using a single channel interleaver.

FIG. 2 illustrates a channel coding unit of a terminal including a plurality of transmit antennas, and transmitting data and control information to a base station using a plurality of physical channels.

Referring to FIG. 2, a first uplink data (UL-SCH) channel coding unit 210 and a second UL-SCH channel coding unit 220 may perform channel coding of data blocks multiplexed with respect to a plurality of physical channels. Specifically, each of the data blocks may be channel coded by an exclusive UL-SCH channel coding unit separately assigned to each physical channel.

Control information may include at least one of CQI associated with a channel formed between the base station and the terminal, a PMI of the channel, an RI of the channel, and ACK with respect to downlink data. The CQI and the PMI may be channel coded by a CQI channel coding unit 230, the RI may be channel coded by an RI channel coding unit 240, and the ACK may be channel coded by an ACK channel coding unit 250.

The channel coded control information may be segmented into a plurality of control information blocks based on a state of a radio channel formed between the base station and each of a first transmit antenna and a second transmit antenna. The segmented control information blocks may be transmitted to a first channel interleaver 260 and a second channel interleaver 270 corresponding to the physical channels.

According to an embodiment of the present invention, it is possible to configure a channel coding unit by additionally providing, in a conventional channel coding unit, the second UL-SCH channel coding unit 220 for transmitting data and the second channel interleaver 270 of FIG. 2.

Figure 3A:
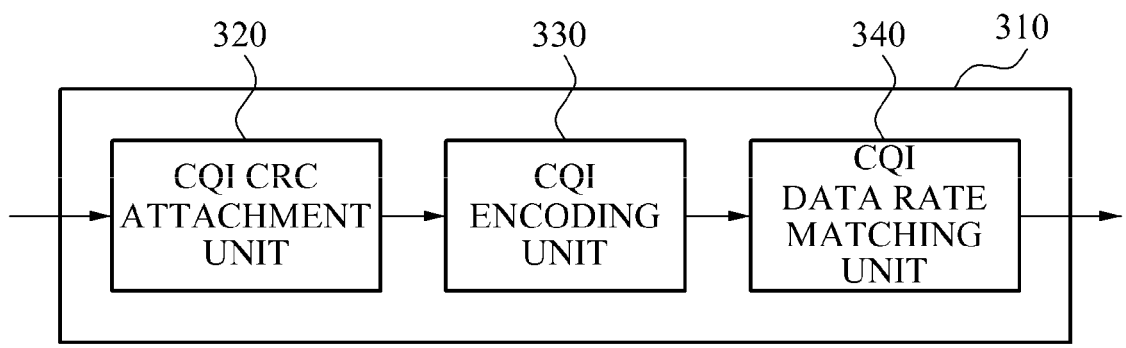
FIGS. 3A through 3C are block diagrams illustrating a configuration of a channel coding unit according to example embodiments of the present invention.
Figure 3B:
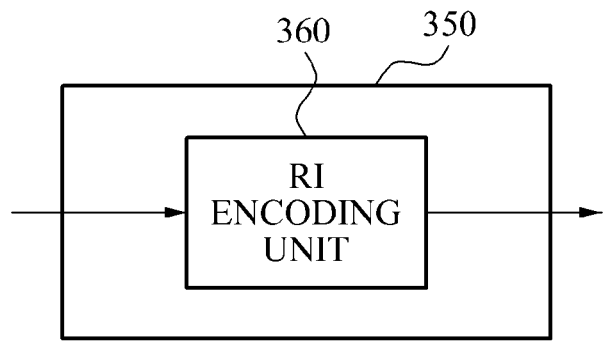
Figure 3C:
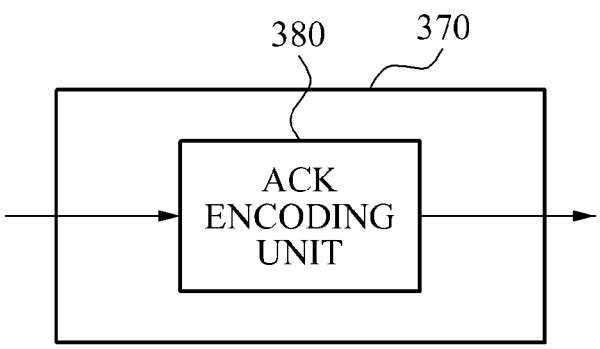

FIGS. 3A through 3C are block diagrams illustrating a configuration of a channel coding unit according to example embodiments of the present invention.

FIG. 3A illustrates an embodiment of a CQI channel coding unit 310 to perform channel coding of CQI.

When a terminal transmits uplink data using two physical channels, and when a different channel coding scheme and a modulation scheme are assigned with respect to each physical channel, the terminal may multiplex the encoded CQI and thereby transmit the multiplexed CQI to the two physical channels.

A CQI CRC attachment unit 320 may attach a predetermined length of CRC to the CQI. The length of CRC attached by the CQI CRC attachment unit 320 may be eight bits. A CQI encoding unit 330 may perform convolutional coding of the CQI with the attached CRC. A code rate of convolutional coding performed by the CQI encoding unit 330 may be ⅓. A CQI data rate matching unit 340 may determine a number of bits of the channel coded CQI based on the data rate determined with respect to each physical channel.

The encoded CQI may be segmented into two information blocks and thereby be mapped to a first physical channel or a second physical channel.

FIG. 3B illustrates an embodiment of an RI channel coding unit 350 to perform channel coding of an RI.

An RI encoding unit 360 may repeatedly perform encoding according to a channel coding scheme and a modulation scheme of an uplink data channel until RI has a predetermined length. The encoded RI may be segmented into two information blocks and thereby be mapped to the first physical channel or the second physical channel.

FIG. 3C illustrates an embodiment of an ACK channel coding unit 370 to perform ACK.

An ACK encoding unit 380 may repeatedly perform encoding according to the channel coding scheme and the modulation scheme of the uplink data channel until ACK has a predetermined length. The encoded ACK may be segmented into two information blocks and thereby be mapped to the first physical channel or the second physical channel.

Figure 4:
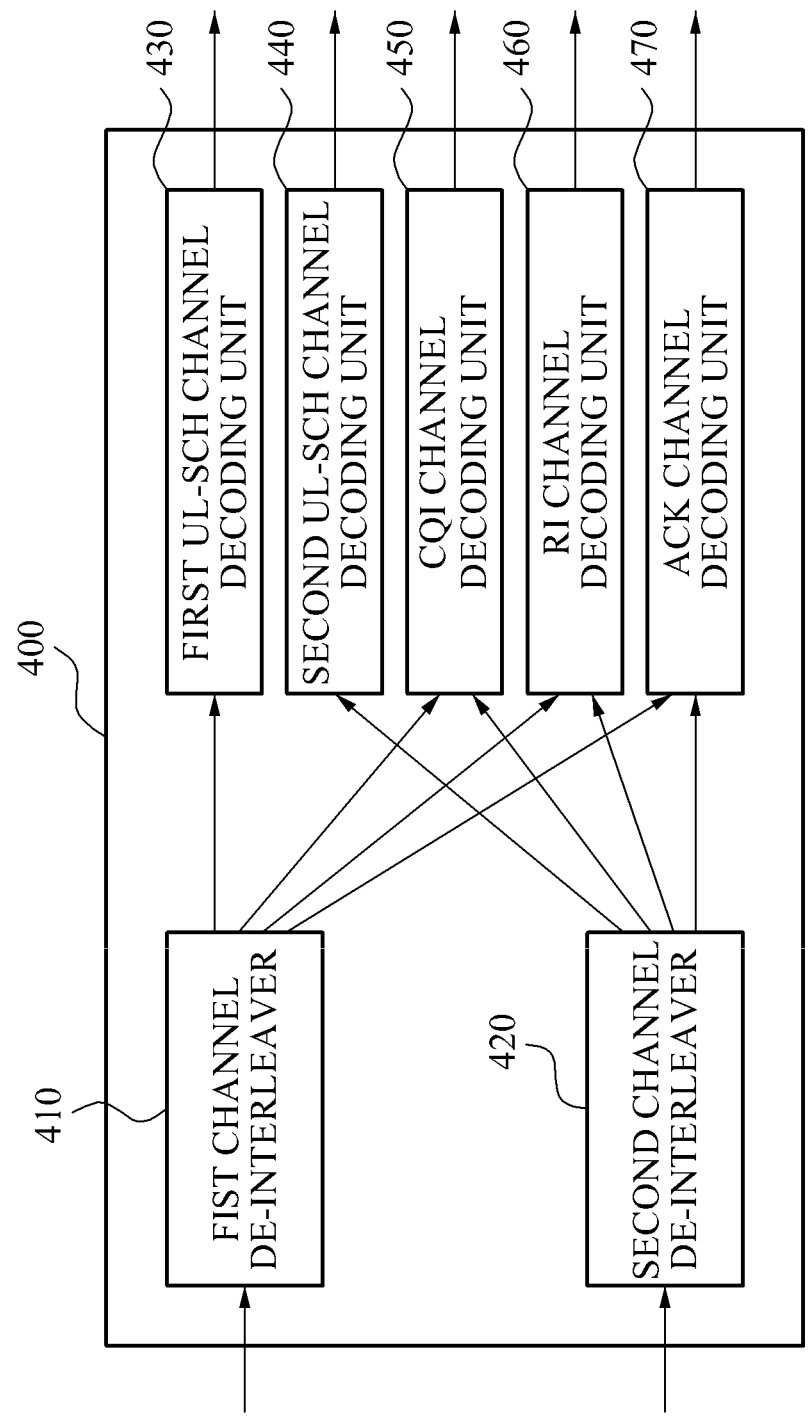
FIG. 4 is a block diagram illustrating a configuration of a channel decoding unit according to an embodiment of the present invention.

FIG. 4 is a block diagram illustrating a configuration of a channel decoding unit 400 according to an embodiment of the present invention.

A base station may receive, from a terminal, control information that is multiplexed and thereby is transmitted to two physical channels. A different channel coding scheme and a modulation scheme may be assigned to each physical channel.

A first channel de-interleaver 410 and a second channel de-interleaver 420 may de-interleave uplink data and the control information that is multiplexed and thereby is transmitted to the physical channels.

A first UL-SCH channel decoding unit 430 may perform channel decoding of uplink data de-interleaved by the first channel de-interleaver 410. A second UL-SCH channel decoding unit 440 may perform channel decoding of uplink data de-interleaved by the second channel de-interleaver 420.

Control information may include at least one of CQI associated with a channel between the base station and the terminal, a PMI of the channel, an RI of the channel, and ACK with respect to downlink data.

The CQI may be segmented into a plurality of information blocks and thereby be transmitted from the terminal to the base station. For example, a first CQI block may be mapped to a first physical channel and be de-interleaved by the first channel de-interleaver 410. A second CQI block may be mapped to a second physical channel and be de-interleaved by the second channel de-interleaver 420.

A CQI channel decoding unit 450 may combine the first CQI block and the second CQI block, and perform channel decoding of the combined CQI.

An RI may be segmented into a plurality of information blocks and thereby be transmitted from the terminal to the base station. An RI channel decoding unit 460 may combine an RI block de-interleaved by the first channel de-interleaver 410 and an RI block de-interleaved by the second channel de-interleaver 420, and perform channel decoding of the combined RI block.

Similarly, an ACK channel decoding unit 470 may combine an ACK block de-interleaved by the first channel de-interleaver 410 and an ACK block de-interleaved by the second channel de-interleaver 420, and perform channel decoding of the combined ACK block.

Figure 5A:
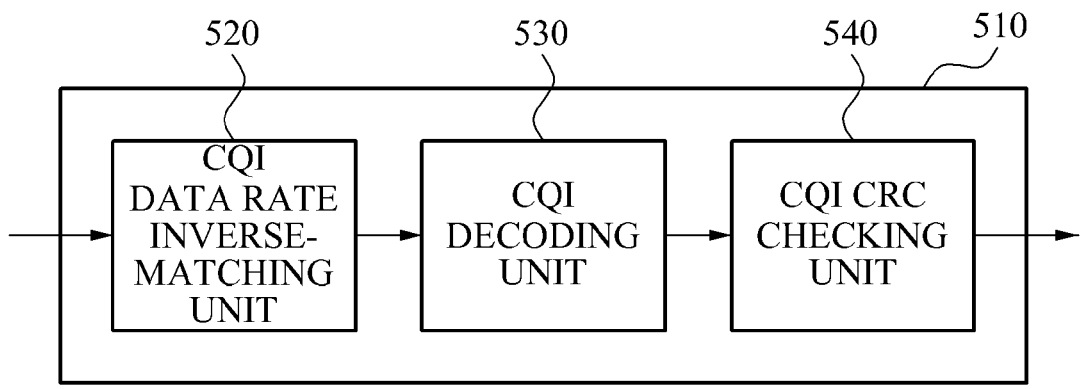
FIGS. 5A through 5C are block diagrams illustrating a configuration of a control information channel decoding unit according to example embodiments of the present invention.
Figure 5B:
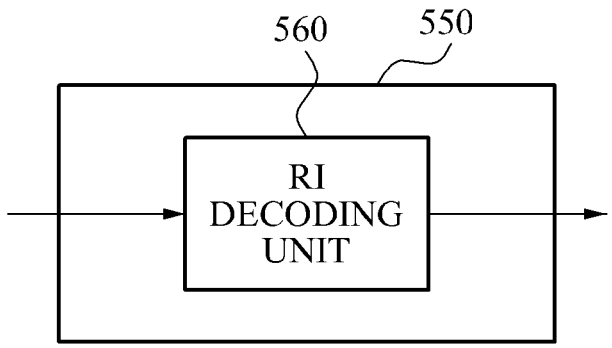
Figure 5C:
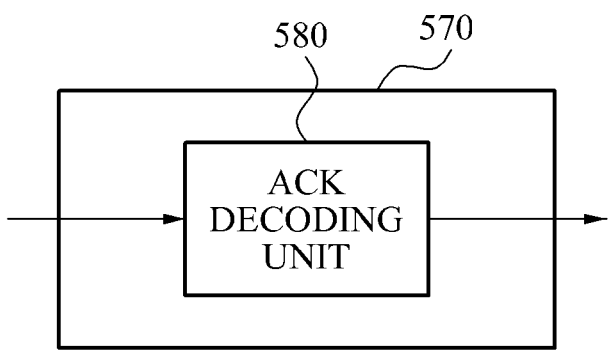

FIGS. 5A through 5C are block diagrams illustrating a configuration of a control information channel decoding unit according to example embodiments of the present invention.

FIG. 5A illustrates an embodiment of a CQI channel decoding unit 510 to perform channel decoding of CQI.

When a terminal transmits uplink data using two physical channels, and when a different channel coding scheme and a modulation scheme are assigned with respect to each physical channel, a base station may receive, from the terminal, multiplexed CQI using the two physical channels.

A CQI data rate inverse-matching unit 520 may receive multiplexed CQI bocks using the two physical channels, and perform data rate inverse-matching. A CQI decoding unit 530 may perform channel decoding of the data-rate inverse-matched CQI. A CQI CRC checking unit 540 may check a CRC of CQI and determine whether an error occurs in the CQI.

FIG. 5B illustrates an embodiment of an RI channel decoding unit 550 to perform channel decoding of an RI. An RI decoding unit 560 may receive, from two de-interleavers (not shown), the RI multiplexed using two physical channels, and decode the RI.

FIG. 5C illustrates an embodiment of an ACK channel decoding unit 570 to perform channel decoding of ACK. An ACK decoding unit 580 may receive, from two de-interleavers, the RI multiplexed using the two physical channels, and decode the ACK.

Figure 6:
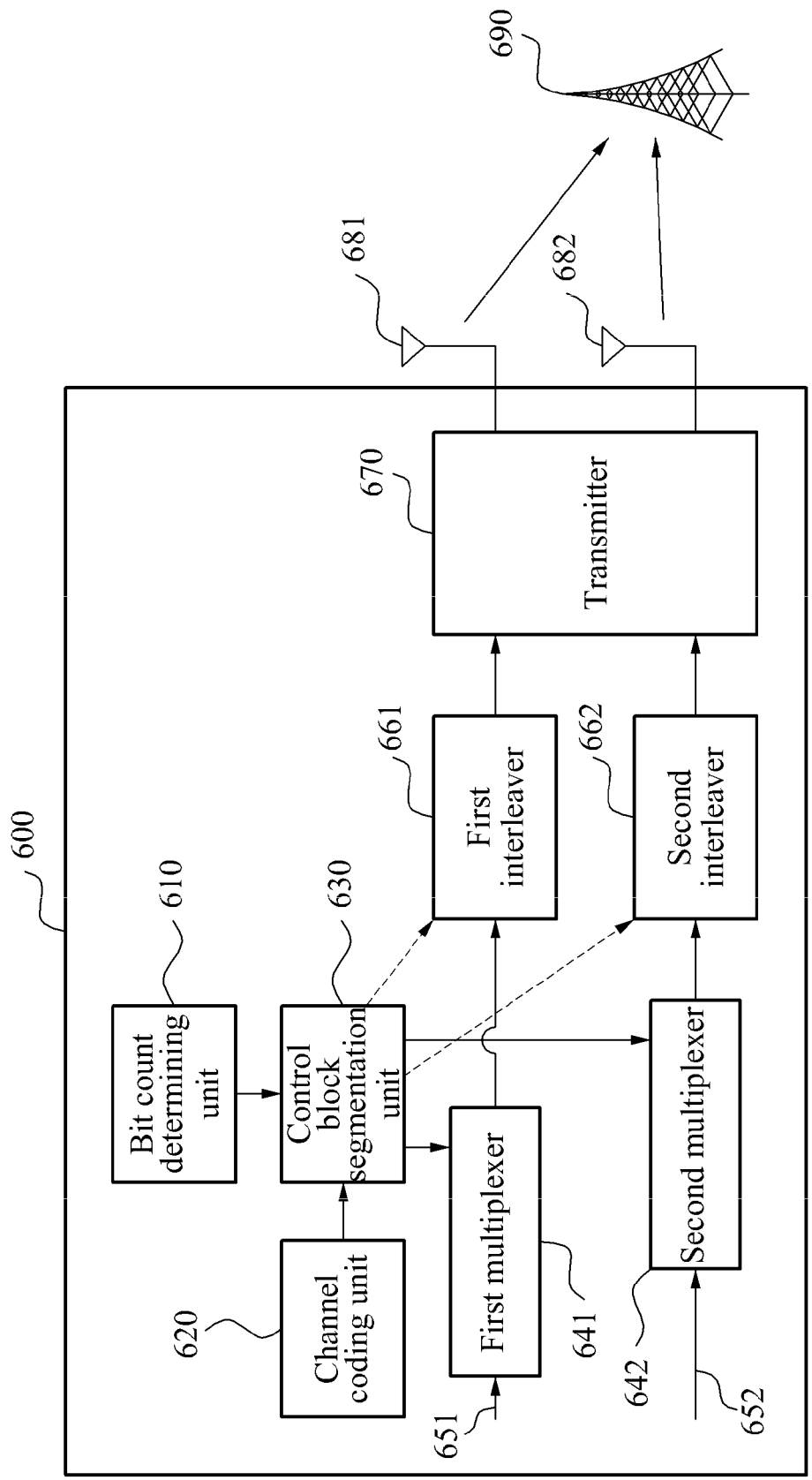
FIG. 6 is a block diagram illustrating a configuration of a terminal multiplexing control information to transmit the multiplexed control information to a base station according to an embodiment of the present invention.

FIG. 6 is a block diagram illustrating a configuration of a terminal 600 multiplexing control information to transmit the multiplexed control information to a base station 690 according to an embodiment of the present invention. The control information may include at least one of CQI associated with a radio channel formed between the base station 690 and each of transmit antennas corresponding to physical channels 681 and 682, a PMI of the radio channel, an RI of the radio channel, and ACK with respect to downlink data.

A bit count determining unit 610 may determine a number of bits of the control information with respect to each of the physical channels 681 and 682 based on a data rate of each of the physical channels 681 and 682. The data rate may be determined based on a state of a radio channel formed between the base station 690 and each of the transmit antennas corresponding to the physical channels 681 and 682. Accordingly, the data rate may be differently determined with respect to each of the physical channels 681 and 682.

The bit count determining unit 610 may determine the number of bits of control information by further employing a modulation scheme or a channel coding scheme with respect to the control information.

A control information segmentation unit 630 may segment the control information into a plurality of control information blocks based on the determined number of bits. A length of each control information block may correspond to the determined number of bits.

A first multiplexer 641 and a second multiplexer 642 may respectively receive uplink data 651 and 652 mapped to the physical channels 681 and 682. When the control information corresponds to CQI or a PMI, the first multiplexer 641 and the second multiplexer 642 may multiplex the uplink data 651 and 652, and the control information. The control information multiplexed with the uplink data 651 and 652 may be input to a first interleaver 661 or a second interleaver 662. When the control information corresponds to an RI or ACK, the control information may be input to the first interleaver 661 or the second interleaver 662. Each of the first interleaver 661 and the second interleaver 662 may interleave the input uplink data and control information.

A transmitter 670 may receive physical channels, and perform modulation with respect to each of the physical channels 681 and 682, and then transmit, to the base station 690, a physical channel containing a control information block.

According to an embodiment of the present invention, the bit count determining unit 610 may determine a number of bits with respect to each physical channel, based on a modulation scheme with respect to control information, and the transmitter 670 may transmit each control information block using the modulation scheme with respect to control information.

According to another embodiment of the present invention, the bit count determining unit 610 may determine a number of bits with respect to each transmit antenna based on a channel coding scheme with respect to control information, and a channel coding unit 620 may perform channel coding of the control information using the channel coding scheme with respect to control information. The channel coding unit 620 may perform channel coding of the control information using one of a convolutional coding scheme and a block coding scheme.

Figure 7:
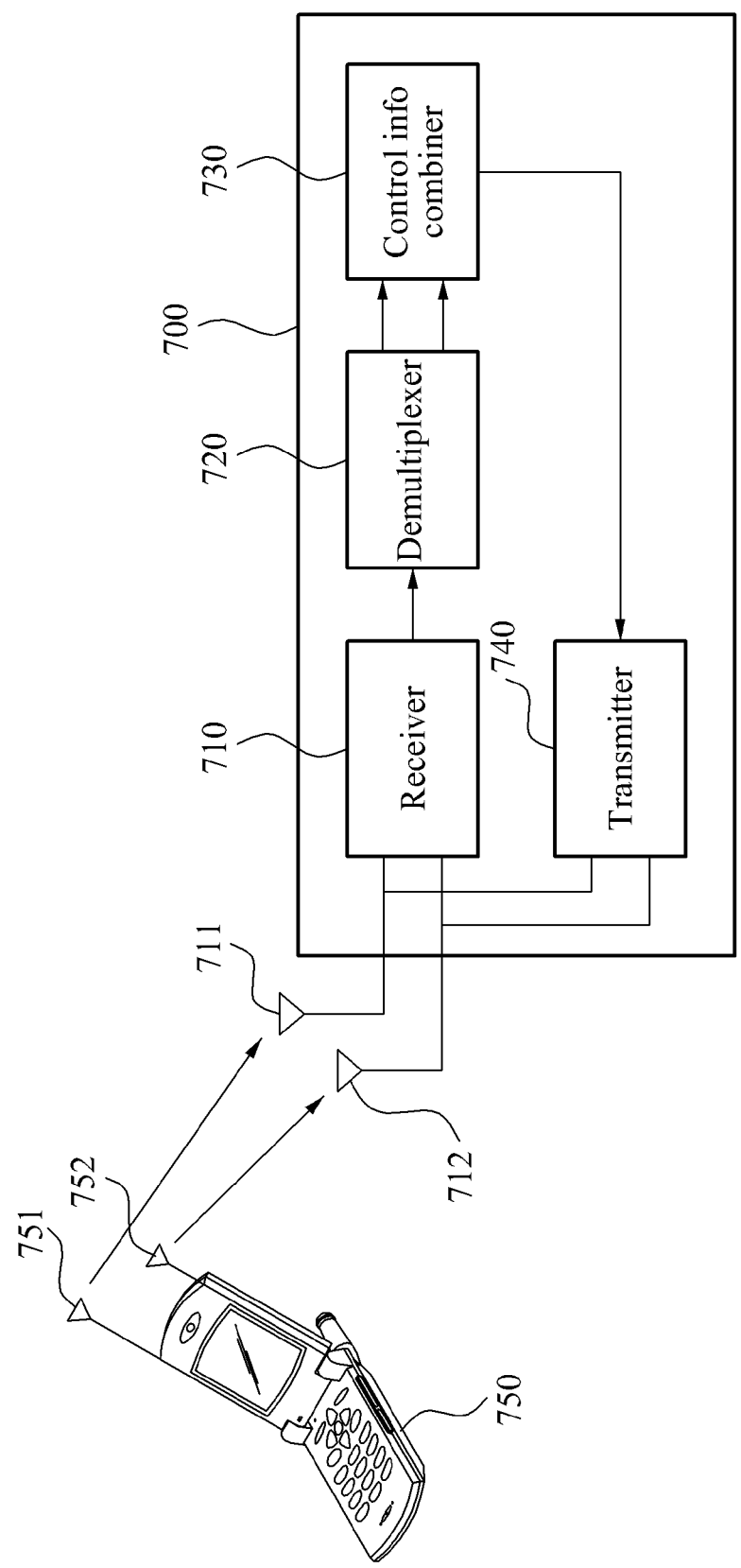
FIG. 7 is a block diagram illustrating a configuration of a base station receiving multiplexed control information from a terminal according to an embodiment of the present invention.

FIG. 7 is a block diagram illustrating a configuration of a base station 700 receiving multiplexed control information from a terminal 750 according to an embodiment of the present invention.

A receiver 710 may receive, from a plurality of transmit antennas 751 and 752 of the terminal 750, data streams corresponding to the transmit antennas 751 and 752 using a plurality of receive antennas 711 and 712. A data stream may include uplink data and control information. The control information may include at least one of CQI associated with a downlink radio channel, a PMI, and an RI.

A demultiplexer 720 may extract a control information block included in each data stream. A length of each control information block may be determined based on a data rate with respect to each of the transmit antennas 751 and 752. The data rate may be determined based on a channel state with respect to each of the transmit antennas 751 and 752. Accordingly, lengths of control information blocks transmitted using the different transmit antennas 751 and 752 may be different from each other.

A control information combiner 730 may generate the control information by combining the extracted control information blocks.

A transmitter 740 may transmit downlink data to the terminal using the control information.

For example, the control information may include ACK with respect to the downlink data. When the terminal 750 fails in receiving the downlink data, the terminal 750 may not transmit the ACK, or may transmit not acknowledgement (NACK).

When the terminal 750 does not receive the downlink data, the transmitter 740 may retransmit the downlink data to the terminal 750.

Figure 8:
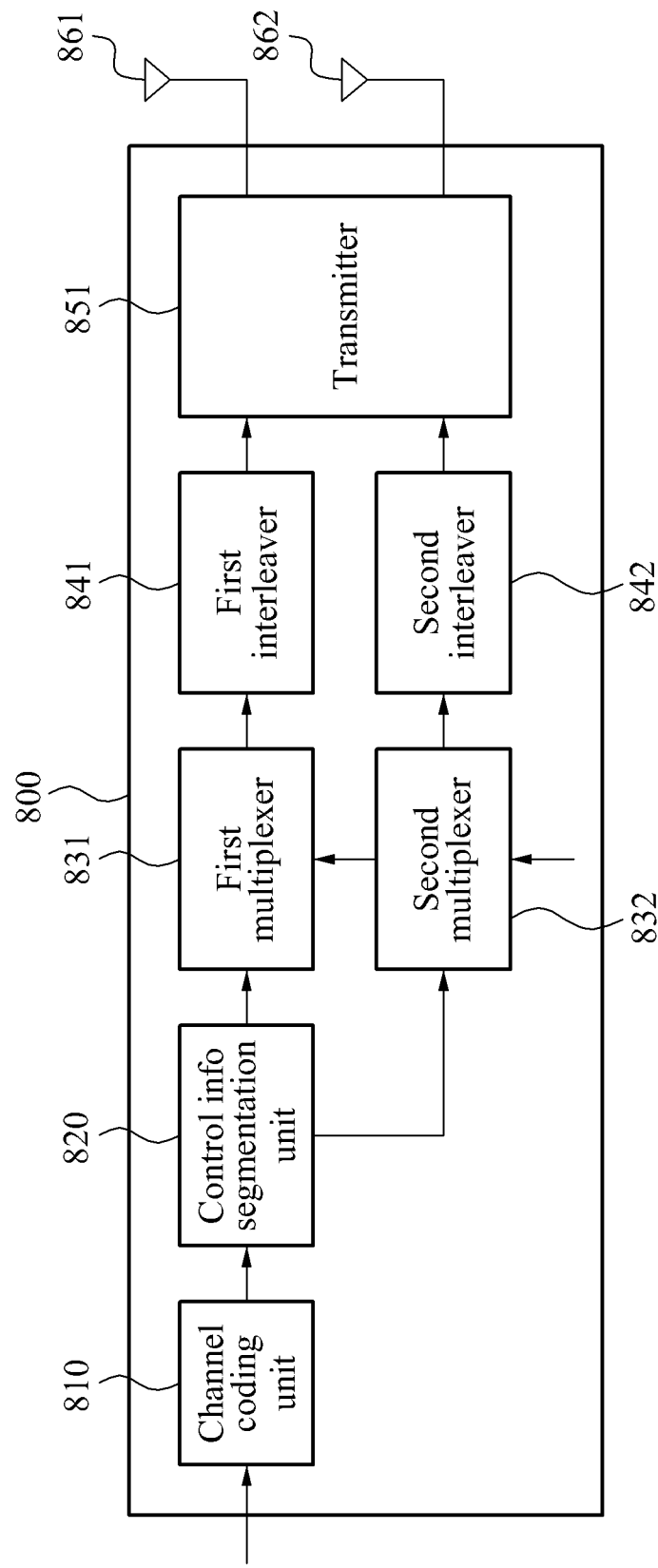
FIG. 8 is a block diagram illustrating a configuration of a terminal multiplexing control information to transmit the multiplexed control information to a base station according to another embodiment of the present invention.

FIG. 8 is a block diagram illustrating a configuration of a terminal 800 multiplexing control information to transmit the multiplexed control information to a base station according to another embodiment of the present invention.

A channel coding unit 810 may perform channel coding of control information. The channel coding unit 810 may perform channel coding of the control information using one of a convolutional coding scheme and a block coding scheme.

A control block segmentation unit 820 may segment the channel coded control information into a plurality of control information blocks. A number of control information blocks segmented by the control block segmentation unit 820 may be less than or equal to a number of transmit antennas 861 and 862 installed in the terminal 800.

The control information block segmentation unit 820 may determine a length of each control information block, for example, an amount of information contained in each control information block, based on a state of a radio channel formed between a base station and each of the transmit antennas 861 and 862.

The channel coding unit 810 may determine a channel coding scheme with respect to the control information, based on the state of the radio channel. The control information segmentation unit 820 may determine the length of each control information block based on the determined channel coding scheme.

When the control information corresponds to CQI or a PMI, each of a first multiplexer 831 and a second multiplexer 832 may multiplex the control information and uplink data. The control information multiplexed with the uplink data may be interleaved by a first interleaver 841 and a second interleaver 842.

When the control information corresponds to ACK, the control information may not be multiplexed with data, and may be directly interleaved by the first interleaver 841 and the second interleaver 842.

Each of the first interleaver 841 and the second interleaver 842 may generate a bitstream corresponding to each physical channel by interleaving a corresponding control information block.

Through a modulation process corresponding to each bitstream, a transmitter 851 may transmit each bitstream to a base station using corresponding transmit antennas 861 and 862. A data rate of each transmit antenna may be determined based on a state of a radio channel formed between each of the transmit antennas 861 and 862, and the base station. When the state of the radio channel is excellent, the data rate may be determined to have a relatively great value. When the state of the radio channel is not excellent, the data rate may be determined to have a relatively small value.

The transmitter 851 may determine a modulation scheme with respect to control information based on the state of the radio channel, and may modulate the control information using the determined modulation scheme.

The control information may correspond to ACK with respect to downlink data received from the base station. The terminal may determine whether an error has occurred in the downlink data, may determine whether the downlink data is successfully received, and may transmit the ACK to the base station.

When the terminal transmits NACK, the terminal may receive again the downlink data from the base station.

The control information may be a PMI of the radio channel. Specifically, the terminal 800 may transmit, to the base station, the PMI of the channel. The base station may transmit the downlink data to the terminal 800 using the PMI. The terminal 800 may receive the downlink data that is transmitted from the base station based on the PMI.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A terminal comprising a plurality of transmit antennas, the terminal comprising:
   a bit count determining unit to determine a number of bits of control information with respect to each of the transmit antennas based on a data rate of each of the transmit antennas;
   a control information segmentation unit to segment the control information into a plurality of control information blocks based on the determined number of bits; and
   a transmitter to transmit each of the control information blocks to a base station using a transmit antenna corresponding to each of the control information blocks.

2. The terminal of claim 1, wherein the data rate is different for each of the transmit antennas.

3. The terminal of claim 1, wherein:
   the bit count determining unit to determine the number of bits by further employing a modulation scheme with respect to of the control information, and
   the transmitter transmits each of the control information blocks using the modulation scheme with respect to the control information.

4. The terminal of claim 1, further comprising:
   a channel coding unit to perform channel coding of the control information using a predetermined channel coding scheme,
   wherein the bit count determining unit determines the number of bits by further employing a channel coding scheme with respect to the control information, and
   the control information segmentation unit segments the channel coded control information.

5. The terminal of claim 4, wherein the channel coding unit performs channel coding of the control information using one of a convolutional coding scheme and a block coding scheme.

6. The terminal of claim 1, wherein the control information comprises at least one of channel quality information associated with a channel formed between the base station and the terminal, a precoding matrix index of the channel, a rank indicator of the channel, and downlink data acknowledgement.

7. The terminal of claim 6, further comprising:
   a multiplexer to multiplex the channel quality information or the precoding matrix indicator with uplink data,
   wherein the transmitter transmits the channel quality information or the precoding matrix indicator multiplexed with the uplink data.

8. The terminal of claim 1, further comprising:
   an interleaver to interleave each of the control information blocks,
   wherein the transmitter transmits each of the interleaved control information blocks.

9. The terminal of claim 1, wherein:
   the control information corresponds to acknowledgement with respect to downlink data received from the base station, and
   the terminal receives again the downlink data from the base station.

10. A base station comprising:
    a receiver to receive, from a plurality of transmit antennas installed in a terminal, a data stream corresponding to each of the transmit antennas;
    a demultiplexer to extract a control information block included in each of data streams;
    a control information combiner to generate control information by combining the extracted control information blocks; and
    a transmitter to transmit data to the terminal based on the combined control information,
    wherein a length of the control information is determined based on a data rate of each bitstream.

11. The base station of claim 10, wherein the control information comprises at least one of channel quality information associated with a channel formed between the base station and the terminal, a precoding matrix index of the channel, a rank indicator of the channel, and downlink data acknowledgement.

12. The base station of claim 10, further comprising:
    a transmitter,
    wherein the control information corresponds to acknowledgment with respect to downlink data transmitted to the terminal, and
    the transmitter retransmits the downlink data to the terminal.

13. A terminal comprising:
    a channel coding unit to perform channel coding of control information;
    a control information segmentation unit to segment the channel coded control information into a plurality of control information blocks;
    an interleaver to generate a bitstream corresponding to each of a plurality of transmit antennas by interleaving each of the segmented control information blocks; and
    a transmitter to transmit each of generated bitstreams using a transmit antenna corresponding to each of the generated bitstreams,
    wherein a length of the control information is determined based on a data rate of each bitstream.

14. The terminal of claim 13, wherein the channel coding unit performs channel coding of the control information using one of a convolutional coding scheme and a block coding scheme.

15. The terminal of claim 13, wherein the control information comprises at least one of channel quality information associated with a channel formed between the base station and the terminal, and a rank indicator of the channel.

16. The terminal of claim 15, further comprising:
    a multiplexer to multiplex the channel quality information or the precoding matrix indicator with uplink data,
    wherein the interleaver interleaves the channel quality information or the precoding matrix indicator multiplexed with the uplink data.

17. The terminal of claim 13, wherein a length of each control information block is determined based on at least one of a data rate of each bitstream, a channel coding scheme with respect to the control information, and a modulation scheme with respect to the control information.

18. The terminal of claim 13, wherein:
    the control information corresponds to acknowledgement with respect to downlink data received from the base station, and
    the terminal receives again the downlink data from the base station.

19. The terminal of claim 13, wherein:
the control information includes a precoding matrix index of the channel, and
the terminal receives, from the base station, downlink data transmitted based on the precoding matrix index.

\* \* \* \* \*